United States Patent
McLaughlin, Jr.

[11] 3,761,184
[45] Sept. 25, 1973

[54] WIDE ANGLE, NARROW BANDWIDTH LASER DETECTION SYSTEM

[75] Inventor: Joseph L. McLaughlin, Jr., Bolton, Mass.

[73] Assignee: Itek Corporation, Lexington, Mass.

[22] Filed: Feb. 7, 1972

[21] Appl. No.: 224,047

[52] U.S. Cl. ............ 356/186, 250/216, 350/175 TS, 350/196, 350/206, 350/211, 356/257
[51] Int. Cl. ........ G01j 3/46, G02b 3/00, G02b 3/08
[58] Field of Search ........................... 356/186, 256; 350/206, 175 SL, 198, 211, 175 ML, 175 TS, 196; 250/216, 218

[56] References Cited
UNITED STATES PATENTS
| | | | |
|---|---|---|---|
| 3,278,752 | 10/1966 | Brixner | 250/208 |
| 1,716,668 | 6/1929 | Shore | 350/276 SL |
| 3,297,393 | 1/1967 | Ziegler | 350/175 ML |
| 3,368,078 | 2/1968 | Flint et al. | 250/216 |

OTHER PUBLICATIONS
Aid To Viewing Test Plate Interference Fringes, Applied Optics; Vol. 10, No. 9, pg. 2216–2217; Sept. 71.

*Primary Examiner*—Ronald L. Wibert
*Assistant Examiner*—V. P. McGraw
*Attorney*—Homer O. Blair et al.

[57] ABSTRACT

A laser detection system for examining a large field of view to determine if the system is being illuminated by laser radiation at a specific frequency. The system includes a first positive lens system for gathering light over a large field of view and for substantially collimating the light for passage through an interference filter. The interference filter allows the passage of radiation in a narrow bandpass region about the specific frequency of laser radiation of interest. Radiation passing through the filter is then condensed by a second positive lens system and directed onto a photosensitive detector. The first and second lens systems form an image of the detector at the entrance to the first positive lens system which defines the entrance aperture to the laser detection system. In the preferred embodiment the first and second positive lens systems each consist of a hyperhemispherical lens and a fresnel lens.

1 Claim, 3 Drawing Figures

PATENTED SEP 25 1973　　　　　　　　　　　　3,761,184

WIDE ANGLE, NARROW BANDWIDTH LASER DETECTION SYSTEM

BACKGROUND OF THE INVENTION

The present invention relates generally to the field of reconnaissance, and more particularly pertains to a new and improved system for detecting whether a reconnaissance system, such as an airplane, is being illuminated by a laser beam from the reconnoitered territory.

In a reconnaissance system it is often desirable to know that the system is being illuminated by a laser beam of a particular type, as the type laser is indicative of the type of system illuminating the reconnaissance system. For instance, an antiaircraft missile would utilize a different type of laser than a tracking station with a laser range finder. Therefore, knowledge on the type of laser illuminating the reconnaissance system gives information on the types of enemy systems in the reconnoitered territory, and also might alert the reconnaissance system to the possibility of an attack from within the reconnoitered territory. Thus, it is desirable to know whether the reconnaissance system is being illuminated by a laser, and, if so, the type of laser illuminating the system.

In designing a laser detection system several important system parameters should be considered. These parameters include the field of view over which the system detects incident laser radiation, the entrance aperture through which incident radiation is collected, and the spectral content of the radiation seen by the detector.

A general requirement of many laser detection systems is that they detect radiation received from over a very wide field of view. A fisheye lens system has been considered a good choice for these laser detection systems as it is a type of negative lens system which has a very wide field of view. Also, a fisheye lens system generally uses large aperture lenses which enable the detection of very weak illuminating laser sources. Further, a fisheye lens system forms an image of the field of view which may be projected onto a detector or an array of detectors. Designers of reconnaissance systems have often thought in terms of imaging optical systems as in imaging system inherently allows a determination of the location of the illuminating laser beam in the field of view. Information on the location of the illuminating laser beam is desirable for general reconnaissance, and also allows evasive manuevers to be executed if the illuminating laser forms part of an antiaircraft missile or artillery system.

Unfortunately, a laser detection system utilizing a negative fisheye lens system has a number of drawbacks. One disadvantage is the expense of the system. A negative fisheye lens system is an imaging system, and is formed of a number of optical lenses of high quality. Also, a fisheye lens system generally utilizes large aperture lenses. High quality, large aperture, lenses are very expensive. Another drawback to the use of large aperture lenses is that they are easily detectable which could give away the presence of the laser detection system. For example a photograph of a reconnaissance airplane might be examined to ascertain the presence of reconnaissance systems on the airplane. If a large diameter fisheye lens system were protruding from the airplane, then the presence of a laser detection system in the airplane would be a reasonable deduction.

SUMMARY OF THE INVENTION

In accordance with a preferred embodiment, a laser detection system is disclosed wherein in first positive lens system is utilized to gather radiation over a large field of view, and substantially collimate the radiation for passage through an interference filter. After the radiation passes through the filter a second positive lens system condenses the radiation and directs it onto a detector. The first and second lens systems are designed to form an image of the detector at the entrance aperture of the laser detection sytem. The preferred embodiment provides a laser detection system having a field of view which is greater than 90°. Also, the preferred embodiment provides a laser detection system which can be built with inexpensive, low quality lenses. The system does not detect an image, and accordingly, high quality lenses required by imaging systems are not necessary. Also, the preferred laser detection system collimates the detected radiation to angles of incidence on the filter of less than 10° to achieve a negligible shift of the filtering characteristics of the interference filter. Further, the preferred embodiment presents an optical system with minimal volume, and in which the entrance aperture is at least as large as the actual detector surface area. Still further, the preferred embodiment provides an optical system in which the exterior optical element has a very small surface area. A small exterior surface area is desirable as espionage efforts, such as a photograph of an airplane utilizing the laser detection system, would not readily reveal that the airplane has a laser detection system. Also, the preferred embodiment has the capability of allowing a determination of the general location of the origin of the laser beam in the overall field of view even though the field of view is not imaged on the detector.

DETAILED DESCRIPTION OF A PREFERRED EMBODIMENT

When designing a laser detection system consideration should be given to several parameters including, the field of view over which the system detects incident laser radiation, the entrance aperture through which incident radiation is collected, and the spectral content of radiation seen by the detector.

The simplest form of a laser detection system would consist of merely a radiation detector. In such a system the field of view would be equal to the acceptance angle of the detector, and the entrance aperture of the system would be equal to the detector area. The spectral content of the detected radiation would depend upon the characteristics of the detector. If a filter were placed directly in front of the detector, then the spectral content of the detected radiation would depend on the spectral band for which the filter was designed, and, in the case of an interference filter, the angle of incidence of the laser radiation. A laser detection system consisting of a filter positioned directly in front of a detector is often unacceptable for one of three reasons, an insufficient entrance aperture, an inadequate detector field of view, or an intolerable wavelength/angle of incidence ambiguity.

Figure 1:
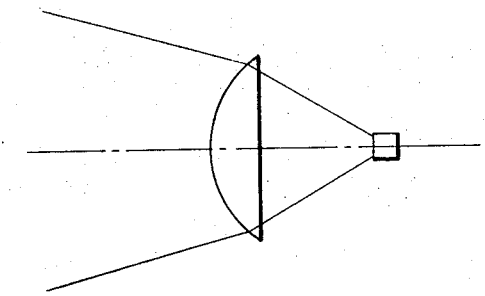
FIG. 1 illustrates a laser detection system in which a positive lens is placed in front of the detector.
Figure 2:
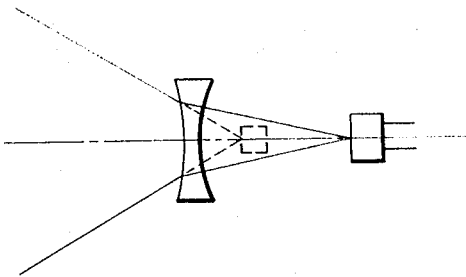
FIG. 2 illustrates a laser detection system in which a negative lens is placed in front of the detector.

Some of these problems may be eliminated by the addition of a simple optical system in front of the detector, as shown in FIGS. 1 and 2. However, each of these detection systems also has drawbacks. Referring to FIG. 1 there is illustrated a laser detection system in which a positive lens system has been placed in front of the detector. The positive lens increases the entrance aperture of the detector from the size of the detector area to the lens aperture. The positive lens may be thought of as a simple magnifier that magnifies the image of the detector until this image is as large as the lens. Unfortunately this gain in entrance aperture is obtained at the expense of the field of view which is decreased as the effective aperture is increased.

FIG. 2 illustrates a laser detection system in which a negative lens system has been placed in front of the detector. As illustrated, this approach results in a rather large field of view for the system. Unfortunately, the gain in field of view is obtained at the expense of the entrance aperture of the system. In this system the size of the entrance aperture is reduced to size of the image of the detector, as shown in dashed lines.

The design of a laser detection system is further complicated by the desirability of providing a determination of the general location of the origin of the laser beam in the overall field of view. Information on the location of the illuminating laser beam is desirable for general reconnaissance, and also to allow evasive manuevers to be executed if the illuminating laser forms part of an anti-aircraft missile or artillery system.

The preferred embodiment was designed to detect laser radiation at only one particular frequency from one type of laser. Accordingly, the bandpass of radiation seen by the detector of the preferred embodiment was a very important design consideration. The present state of the art requires that a system designed to detect a narrow band of radiation with high rejection ratios be built with an interference type filter. The spectral content of radiation passed by an interference filter depends upon the angle of incidence of the radiation on the filter. For radiation incident on an interference filter at other than a normal angle, the spectral bandpass shifts towards the short wavelength end of the spectrum. The amount of this shift is a function of the angle of incidence and the wave length being considered. Accordingly, the preferred embodiment was designed to pass radiation through the interference filter at approximately normal angles.

Further, the preferred embodiment was designed to have a very large field of view on the order of at least 90°, and an optical system which substantially collimates the collected radiation at one point in the system for passage through the interference filter. Also, it was desirable to have a laser detection system which has the capability of allowing a determination of the general location of the origin of the laser beam in the overall field of view. Further, it was desirable to have the system occupy as little volume as possible. When designing a system with a minimum volume, extremely powerful lenses must be used so that the radiation rays are refracted in the required manner.

The present invention teaches that all of the above requirements for a laser detection system may be fulfilled by a system which does not image the field of view onto a detector or an array of detectors. This represents a marked difference from the teaching of the prior art. According to the teachings of this invention, the system is designed to image the detector at the entrance aperture to the lens system, and optimally at approximately the first face of the lens system. This design results in the application to the detector of all radiation incident upon the entrance aperture of the lens system. In accordance with the design of this invention, a first positive lens system is utilized to gather radiation over a large field of view and substantially collimate the radiation for passage through an interference filter. After the radiation passes through the filter, a second positive lens system condenses the radiation and directs it onto a detector.

When designing a particular embodiment in accordance with the teachings of this invention, the system should be designed to image the detector at the entrance aperture to the lens system, and optimally at approximately the first face of the lens system. Further, the lens system may be conveniently designed by designing it to pass radiation telecentrically through the interference filter. When radiation is passed telecentrically through the interference filter, the principal radiation rays, which are the rays from any given direction traveling directly through the center of the entrance aperture, are all substantially parallel to the optical axis. With a telecentric design, rays traveling directly adjacent to the principal ray will deviate from a parallel relationship with the optical axis by a small angle. This angle will increase as a given ray gets further away from the principal ray and nearer to the periphery of the entrance aperture. Rays at opposite peripheral edges of the entrance aperture will each deviate from the principal ray be equal and opposite angles. Thus, in a telecentric design, rays received around the periphery of the entrance aperture will deviate from a parallel relationship with the optical axis by a given maximum angle, and this given maximum angle may be designed to be less than the angle of deviation selected to achieve a negligible shift of the filtering characteristics of the interference filter.

Figure 3:
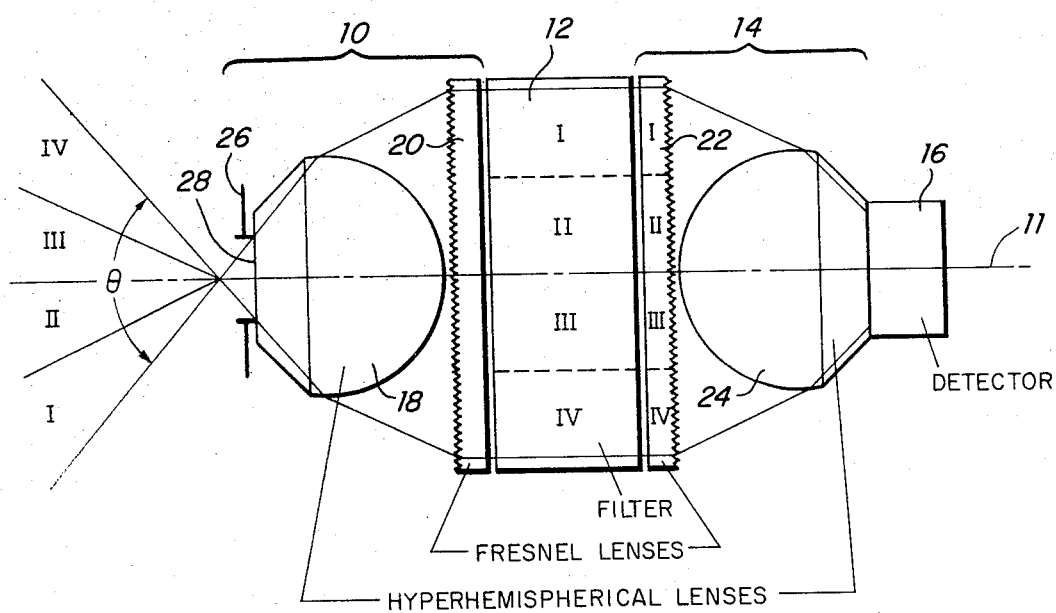
FIG. 3 illustrates a preferred embodiment of the laser detection system of this invention.

Referring to FIG. 3, there is illustrated a preferred embodiment of the laser detection system designed in accordance with the teachings of this invention. Incoming radiation over an angle θ is incident upon a first positive lens system 10. The first positive lens system 10 telecentrically passes the radiation through an interference filter 12 into a second positive lens system 14 which condenses the radiation and directs it onto a photodetector 16. The telecentrically passed radiation is collimated to within 10° of the optical axis 11 while passing through the interference filter. In the preferred embodiment, the first lens system 10 consists of a hyperhemispherical lens 18 and a fresnel lens 20, and the second lens system 14 also consists of a hyperhemispherical lens 24 and a fresnel lens 22. The first and second lens systems are arranged symmetrically about interference filter 12. In alternative embodiments other positive lens systems might be designed for the laser detection system. FIG. 3 also illustrates a field stop 26 which is the size of the detector image. The field stop limits radiation entering the system to only that received through the entrance aperture.

While designing the first lens system of the preferred embodiment illustrated in FIG. 3, a hyperhemispherical lens was chosen for the first lens as it is an extremely powerful positive lens. The particular hyperhemispherical lens of the preferred embodiment was chosen as that lens happened to be readily available to the inventor. Other hyperhemispherical lenses with different characteristics might be used in alternative embodiments. A fresnel lens was chosen for the second lens of the first lens system as a fresnel lens occupies a minimal volume, a fresnel lens is a reasonably priced lens, and a low quality fresnel lens is adequate as the radiation is not being imaged. The particular fresnel lens of the preferred embodiment was chosen to match the characteristics of the chosen hyperhemispherical lens so that the fresnel lens could be placed immediately adjacent to the hyperhemispherical lens and result in radiation being passed telecentrically through the interference filter.

In the preferred embodiment the second lens system was chosen to be the exact complement of the first lens system. When the first lens system is designed to place the entrance aperture at the first surface 28 of the first lens system, then the telecentric design ensures that a symmetrical arrangement of first and second identical lens systems about the interference filter will form an image of the detector at approximately the first surface 28 when the detector is placed at the last surface.

In the preferred embodiment, the two hyperhemispherical lenses were hyperhemispherical stock number 233-602 from American Optical Company. This lens has an index of refraction of 1.6710, an effective focal length of 12.97 mm, a front focal length of 12.97 mm, a back focal length of 5.62 mm, a center thickness of 11.87 mm, and a radius of curvature of 8.5 mm. The two fresnel lenses of the preferred embodiment are available from Optical Science Company, Inc., San Francisco, California, and each has a 1 inch diameter, a 1 inch focal length, an index of refraction of 1.49 mm, a thickness of 1.59 mm, and 100 grooves per inch. The interference filter had a thickness of 0.375 inches, and was selected to allow the detection or radiation in the bandpass region of interest. The diameter of the field stop, which is equal to the diameter of of the detector image, was 0.080 inches. The spacing between each of the elements of the preferred embodiment is the minimum possible spacing without actual physical interference between the elements. The laser detection system of the preferred embodiment has a field of view of 116°.

The illustrated laser detection system has the capability of determining the direction of the incident laser beam as follows. For the purpose of illustration the field of view has been divided into four zones I, II, III and IV, although in other embodiments the field of view could be divided into any desired number of zones. Radiation incident from zone I of the field of view will be directed by lens system 10 into sections I of interference filter and then through lens system 14 and onto detector 16. Likewise, radiation from zone II of the field of view will be directed through sections II of filter and then through lens system 14 and onto detector 16. In a like manner radiation from zones III and IV will be directed through sections III and IV of filter 12 and then through lens system 14 and onto detector 16. Directional capability might be imparted to the system by substituting four separate lens and four separate detectors for lens 24 and detector 16. In such an embodiment the positive lens system 24 would be replaced by four separate positive lens systems, each of which would pick up radiation though its zone and then direct the radiation back to a separate photodetector.

Although the preferred embodiment has been illustrated with each of the lens systems 10 and 14 having a hyperhemispherical lens and a fresnel lens, other positive lens systems might be substituted therefor in alternative embodiments. Also, although the preferred embodiment is illustrated as having first and second compound lens systems, other embodiments might be built having first and second single element positive lens systems. In those embodiments it is likely that each of the positive lens systems would not be as powerful as the lens systems illustrated in FIG. 3. This loss of power would result in an image of detector 16 being projected forward of the entrance face 28 to the lens system. In such a system the field of view would be smaller, and would be determined by the angle through which radiation could travel through the image of detector 16 and still enter the lens system.

If the capability to detect several types of laser beams were desired, then several laser detection systems could be utilized with the filter for each system being selected for a different laser beam.

While several embodiments have been described, the teachings of this invention will suggest many other embodiments to those skilled in the art.

I claim:

1. A detection system for examining a large field of view to determine if the detection system is being illuminated by radiation at a specific frequency, and comprising:

a. a detector means responsive to radiation at said specific frequency for producing a signal when the detector means is illuminated by radiation at said specific frequency;

b. an optical system for passing nonimaged radiation received over the field of view and in a predetermined narrow band pass region around said specific frequency to said detector means, and for forming an image of said detector means at the entrance aperture of the optical system, and including:

i. an interference filter means for allowing radiation in said predetermined naroow narrow pass region about said specific frequency to be passed to said detector means, said interference filter means having the characteristic of shifting its band pass region for radiation not received at angles substantially perpendicular to the interference filter means, whereby it is necessary to substantially collimate the radiation received over the large field of view and pass it through said interference filter means at substantially perpendicular angles;

ii. a first positive lens system for receiving radiation from over the large field of view and for substantially collimating the radiation for telecentric passage through said interference filter means, said first positive lens system including a first fresnel lens in juxtaposition with said interference filter means, and a first hyperhemispherical lens in juxtaposition with said first fresnel lens with its hyperhemispherical surface facing said first fresnel lens such that radiation from the field of view is received by said first hyperhemishperical lens, passed by said first hyperhemispherical lens to said first fresnel lens, and then passed by said first fresnel lens to said interference filter means; and iii. a second positive lens system for receiving radiation passed by said filter means and for condensing it and directing it onto said detector means, said second positive lens system including a second fresnel lens in juxtaposition with said interference filter means, and a second hyperhemispherical lens in juxtaposition with said second fresnel lens and said detector means with its hyperhemispherical surface facing said second fresnel lens such that radiation is passed by said interference filter means to said second fresnel lens, passed by said second fresnel lens to said second hyperhemispherical lens, and then passed by said second hyperhemispherical lens to said detector means.

* * * * *